Jan. 21, 1964 W. G. PFANN 3,118,794

COMPOSITE TUNNEL DIODE

Filed Sept. 6, 1960

INVENTOR
W. G. PFANN
BY
George S. Indig
ATTORNEY 3,118,794
Patented Jan. 21, 1964

3,118,794

COMPOSITE TUNNEL DIODE

William G. Pfann, Far Hills, N.J., assignor to Bell Telephone Laboratories, Incorporated, New York, N.Y., a corporation of New York Filed Sept. 6, 1960, Ser. No. 54,293
4 Claims. (Cl. 148—33.1)

Figure 1:
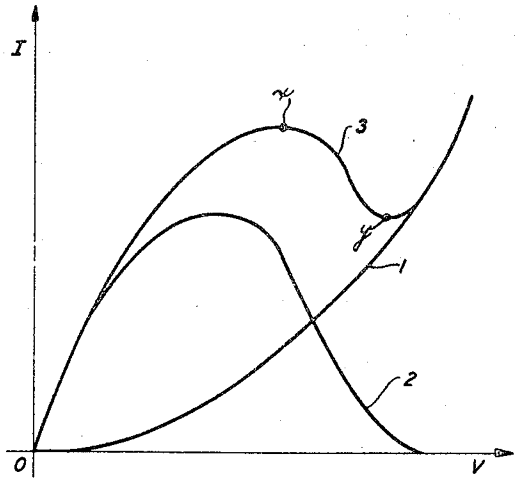

This invention relates to an improved tunnel diode construction. More specifically, it relates to a tunnel diode having a forward bias current voltage characteristic which reflects a high peak-to-valley ratio.

The advantages in tunnel diodes reside in large part to their negative resistance characteristic. The size or extent of the negative resistance is dependent on the relation between the tunneling current and the normal p-n junction current. A large peak-to-valley ratio is favored by a large tunnel current accompanied by a small normal junction current. This leads to conflicting requirements for the semiconductor material. A large tunnel current is favored by a small energy gap value whereas a small normal current is favored by a large energy gap value. Many semiconductors that tunnel well have such small energy gap values that the normal current is large enough to mask the tunnel current. Accordingly, in the past, it has been assumed that both a large tunnel current due to a small energy gap and a small normal current due to a large energy gap were impossible to obtain. Consequently, a few materials are generally used as a comprise which show optimum tunnel current relative to normal current.

According to the teachings of this invention, a way has been discovered whereby a tunnel diode can be obtained which exhibits two energy gap values, one of which controls the tunnel mechanism, the other of which controls the normal current. Adjustment of the relative energy gap values of these materials results in high tunneling probability with low attendant normal current, i.e., a high peak-to-valley ratio.

The novel construction according to this invention is a multi-layer composite diode. The preferred construction is a p-n junction having a thin intermediate layer of a semiconductor having a low energy gap value. In the resulting diode, the magnitude of the normal junction current is dictated by the energy gap value prevailing in the p-n junction material, whereas the energy gap value that controls the tunneling mechanism is that of the intermediate layer.

Figure 2:
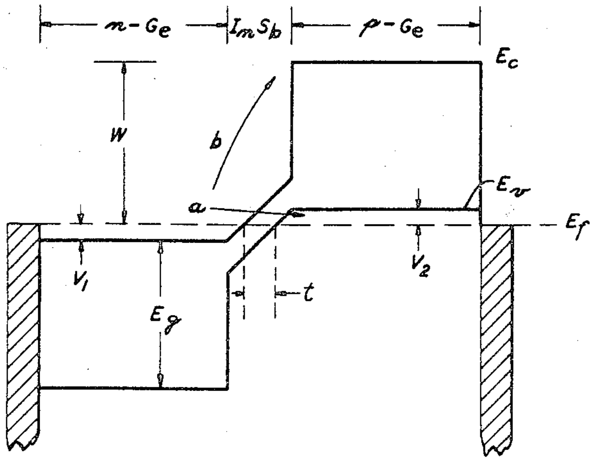

In order to more fully appreciate the foregoing statements, reference is made to the drawing in which:

FIG. 1 is a plot of a typical current voltage characteristic for a tunnel diode showing the normal current, the tunnel current and the overall diode current; and FIG. 2 is an energy level diagram for a typical composite structure according to this invention.

From FIG. 1 it can be seen that the normal p-n junction characteristic, curve 1, and the tunnel characteristic, curve 2, combine to give a typical overall tunnel diode characteristic, curve 3 showing a negative resistance region *xy*. The peak-to-valley ratio is calculated as $x/y$. It is readily apparent that a suppression of the normal current relative to the tunnel current or an increase in the tunneling probability relative to a static normal current will increase the extent of the negative resistance region *xy* and the peak-to-valley ratio $x/y$. By the teachings of this invention, each of these variations can occur simultaneously.

FIG. 2 shows an energy level system for a typical composite structure, wherein $E_c$, $E_v$ and $E_f$ are the energy levels of the conduction band, valence band and Fermi level, respectively, $E_g$ is the energy gap value of the p-n junction material and $t$ is the barrier thickness of the intermediate layer. In this case, a thin intermediate layer of a material that tunnels well, here InSb, is interposed between a normal p-n junction of CdTe, a material having a relatively higher energy gap value. On forward biasing, tunneling occurs across the energy gap of InSb (path "*a*") but the normal current (via path "*b*") is now hindered by the large potential barrier of height W. In other words, the energy gap value and effective mass influencing the tunnel current are those of the intermediate layer InSb, while the energy gap for the normal current is that of CdTe.

The field F across the layer is approximately equal to the ratio of the voltage rise $(E'_g+V_1+V_2)$, to the layer thickness, L, where $E'_g$ is the energy gap of layer $V_1$ and $V_2$ are penetrations of Fermi level into conduction band on n-side and valence band on p-side respectively. The barrier thickness, $t$, seen by an electron tunneling at the Fermi level is then $$\frac{\sim E'_g}{F}$$

Thus, for example, the layer thickness L required to provide a $t$ of $10^{-6}$ cm. is:

$$L \cong (t)\frac{(E'_g+V_1+V_2)}{E'_g} \cong (10^{-6})\frac{0.3}{0.2}$$

$$L \cong 1.5 \cdot 10^{-6} \text{ cm.}$$

Therefore, it is seen that the barrier thickness, which is a primary factor determining the magnitude of the tunnel current, is approximately equal to the thickness of the intermediate layer. Preferred thicknesses for the intermediate low energy gap layer are 10–300 Angstroms.

The material constituting the intermediate layer may be of any material that exhibits tunneling characteristics which are superior to those of the material of each bounding layer. While some improvement in the negative resistance characteristic of a tunnel diode will result from a composite structure in which the intermediate layer has only a slightly lower energy gap value for the purpose of this invention, the improvement is considered significant when the difference between the energy gap value of the intermediate layer and that of the bounding layers is at least 0.3 electron volt.

The n-type and p-type materials may be any semiconductor material. For convenience, they are preferably the same, although different materials may be used for each bounding layer if desired.

A problem arises in choosing the specific materials for each layer. It is apparent that each interface between different crystalline materials represents a significant source of recombination centers unless the materials are judiciously chosen. To this end materials constituting the composite structure must be matched to some degree according to their crystal lattice structure. The composite structures according to this invention can tolerate one dislocation in every 20 atoms. The lattice constant difference dictated by this condition is a maximum of 5%. There is no minimum as the junction is more effective as the lattices match more closely.

Even if the lattice constants match exactly, it is still possible to have dislocations in the boundary between the two semiconductors if the lattices differ in orientation. Accordingly a maximum allowable difference in orientation of about 3 degrees, for equal lattice constants, is dictated by the condition of less than one dislocation in 20 atoms. Since the atoms on either side of the first-order twin plane separating the members of a twinned crystal match exactly, it is to be understood that the above-mentioned misorientation limit refers to the angle either between two parallel lattices, or between two lattices in first-order twin relation with the boundary lying in the twin plane.

A few particular combinations of semiconductors meeting the requirements of this invention are listed in the following table wherein $E_g$ is the energy gap in electron volts, "*a*" is the lattice constant in Angstroms and the melting point of the material is given in degrees centigrade:

*Table I*

| | Material | $E_g$ | *a*, A. | Melting point, °C. |
|---|---|---|---|---|
| 1 | InSb | 0.17 | 6.487 | 523 |
| | CdTe | 1.45 | 6.46 | 1,050 |
| 2 | InAs | 0.37 | 6.04 | 940 |
| | CdSe | 1.77 | 6.05 | 1,350 |
| 3 | HgSe | 0.6 | 6.07 | 690 |
| | CdSe | 1.77 | 6.05 | 1,270 |
| 4 | HgTe | 0.4 | 6.43 | 670 |
| | CdTe | 1.45 | 6.46 | 1,050 |

In each of these examples, the proposed intermediate layer material appears first. The melting points are given to permit consideration of fabrication techniques. Each of the proposed intermediate or low energy gap materials has a small effective electron mass which also favors the probability of tunneling.

There are many appropriate fabrication techniques, most of which make use of well-known procedures. For instance, the intermediate layer material may be vaporized onto either or both bounding surfaces of high gap n-type and p-type materials. The two bounding pieces are then pressed together and heated to melt the interface and bond the crystals. Alternatively, the n-type and p-type crystals may be joined with a space remaining between them. The edge of the joint is then immersed in molten alloy of the composition desired for the intermediate layer in which case capillary action draws the molten material into the space between the bounding materials. Rapid cooling, with added pressure to squeeze out excess liquid, produces the thin intermediate layer. The relative melting points of the materials given in Table I are adapted to each of these procedures.

The intermediate layer may be of any material possessing the requisite energy gap value as defined. The layer may be of any conductivity type, i.e., p-type, n-type or intrinsic.

These fabrication techniques are given by way of example only. Other procedures will become apparent to those skilled in the art. Procedures for making the element, however, form no part of this invention. This invention is directed to a composite tunnel diode structure wherein an intermediate semiconductor material having a low energy gap is bounded by n-type and p-type layers each possessing characteristics of p-n materials of conventional tunnel diodes, each of the bounding materials having an energy gap value of at least 0.3 ev. greater than that of the material of the intermediate layer. Such a construction provides a tunnel diode having improved negative resistance characteristics.

What is claimed is:

1. An improved tunnel diode comprising an n-type semiconductor layer and a p-type semiconductor layer, one of said semiconductor layers having an impurity concentration relative to the other semiconductor layer such that its conduction band has a lower energy level than the valence band of the other semiconductor layer, said diode additionally including an intermediate semiconductor layer contiguous to both of said n-type and p-type layers, said intermediate layer having a thickness of 10–300 Angstroms and having an energy gap value at least 0.3 electron volt less than that of either of the said n-type or p-type semiconductor layers.

2. The diode of claim 1 wherein the lattice constants of the layers match within 5 percent.

3. The diode of claim 1 wherein the crystallographic orientation of the n-type and p-type bounding layers match within an angle of three degrees measured between two parallel lattices.

4. The diode of claim 1 wherein the crystallographic orientation of the n-type and p-type bounding layers match within an angle of three degrees measured between two lattices in first-order twin relation with the boundary lying in the twin plane.

References Cited in the file of this patent

UNITED STATES PATENTS

| | | |
|---|---|---|
| 2,701,326 | Pfann et al. | Feb. 1, 1955 |
| 2,743,201 | Johnson et al. | Apr. 24, 1956 |
| 2,908,871 | McKay | Oct. 13, 1959 |
| 2,929,859 | Loferski | Mar. 22, 1960 |
| 3,024,140 | Schmidlin | Mar. 6, 1962 |
| 3,033,714 | Esaki et al. | May 8, 1962 |

OTHER REFERENCES

Esaki: "New Phenomenon in Narrow Germanium p-n Junctions," Physics Review, 109, 1958, relied on pages 603–604.